United States Patent [19]
Goldberg et al.

[11] Patent Number: 5,724,662
[45] Date of Patent: Mar. 3, 1998

[54] METHOD AN APPARATUS IN A RADIO COMMUNICATION SYSTEM FOR ASSIGNING AND UTILIZING SETS OF TRANSMITTERS

[75] Inventors: Steven Jeffrey Goldberg, Fort Worth; Thomas Casey Hill, Trophy Club, both of Tex.

[73] Assignee: Motorola, Inc., Schaumburg, Ill.

[21] Appl. No.: 649,559

[22] Filed: May 17, 1996

[51] Int. Cl.[6] .................................................. H04R 7/12
[52] U.S. Cl. .......................... 455/503; 455/38.1; 455/525
[58] Field of Search ................................. 455/503, 517, 455/524–525, 452, 38.1; 370/328, 338

[56] References Cited

U.S. PATENT DOCUMENTS

| | | |
|---|---|---|
| 4,875,038 | 10/1989 | Siwiak et al. . |
| 4,968,966 | 11/1990 | Jasinski et al. . |
| 5,263,177 | 11/1993 | Schieve et al. ................ 455/51.2 |
| 5,423,063 | 6/1995 | Goldberg . |
| 5,438,326 | 8/1995 | Gordon et al. ................ 455/38.1 |
| 5,475,863 | 12/1995 | Simpson et al. ............... 455/33.1 |
| 5,606,729 | 2/1997 | D'Amico et al. ............. 455/67.1 |

*Primary Examiner*—Andrew Faile
*Assistant Examiner*—Vincent F. Boccio
*Attorney, Agent, or Firm*—R. Louis Breeden

[57] ABSTRACT

A method and apparatus assigns and utilizes sets of transmitters (206) to provide radio coverage in dynamically assigned simulcast areas for communicating simultaneously with portable transceivers (122). Transmitters are assigned (704) to the sets such that each set is assigned all transmitters dominant to at least one of the portable transceivers having a message queued therefor. A transmitter is defined to be dominant when it can affect communications with the at least one of the portable transceivers while different data transmissions are being sent from all other transmitters. A subset of the sets is determined (708), wherein no transmitter is assigned more than once in the subset. The sets of the subset are then simulcast (710) such that the transmitters assigned to each of the sets of the subset transmit the message queued for the at least one of the portable transceivers to which the transmitters of the set are dominant.

20 Claims, 5 Drawing Sheets

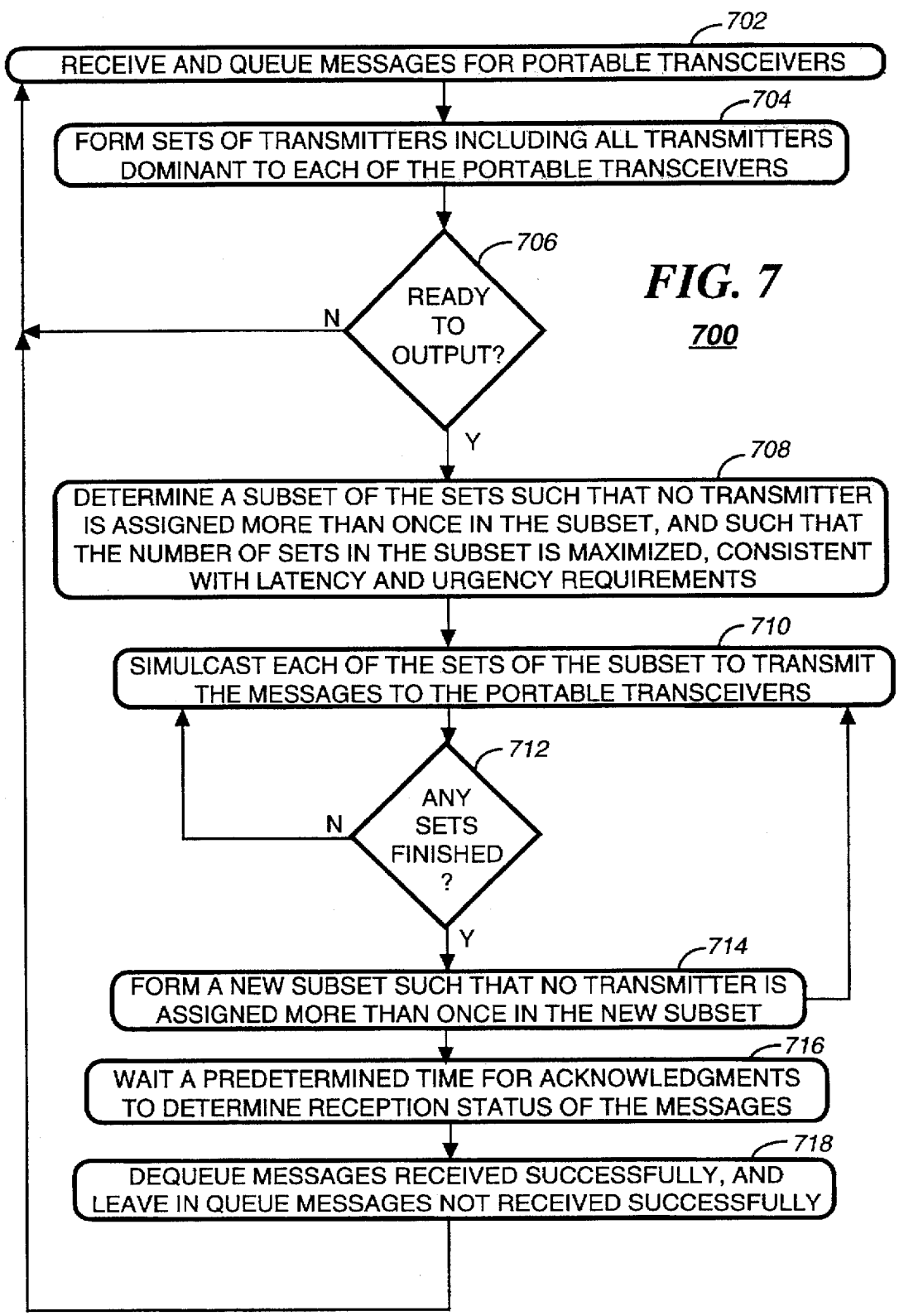

5,724,662

METHOD AN APPARATUS IN A RADIO COMMUNICATION SYSTEM FOR ASSIGNING AND UTILIZING SETS OF TRANSMITTERS

RELATED APPLICATIONS

Ser. No. 08/649,858 filed concurrently herewith by Goldberg, entitled "Adaptive System and Method for Choosing a Selective Call Transmitter."

Application Ser. No. 08/597,049 filed Feb. 5, 1996 by Lin et al., entitled "Method and Apparatus for Transmitting an Outbound Message in a Two-Way Messaging System."

FIELD OF THE INVENTION

This invention relates in general to radio communication systems, and more specifically to a method and apparatus in a radio communication system for assigning and utilizing sets of transmitters.

BACKGROUND OF THE INVENTION

Modern two-way messaging systems have employed wide area simulcast transmission techniques for locating portable subscriber units for which messages have been received and queued, and then have employed single cell transmission techniques with frequency reuse for communicating the informational portions of the messages. While these techniques have performed well for some systems, neither technique has proved optimal for all systems.

In very busy systems, for example, wide area simulcast transmissions for locating the portable subscriber units prior to transmission of the informational portion of each message can consume excessive amounts of airtime. On the other hand, utilizing only a single cell for transmitting the informational portion of all messages can result in poor transmission quality when, for example, a subscriber unit moves into a fringe area between two or more cells.

Thus, what is needed is a transmission technique that can provide both a high transmission quality and a high airtime efficiency. A method and apparatus that can provide an airtime efficiency approaching that of the single cell transmission technique while retaining most of the transmission quality of the simulcast technique would be highly desirable.

SUMMARY OF THE INVENTION

An aspect of the present invention is method in a radio communication system for forming and utilizing sets of base station transmitters selected from a plurality of base station transmitters to provide radio coverage in a plurality of dynamically assigned simulcast areas for communicating simultaneously with a plurality of portable transceivers. The method comprises the step of forming the sets of base station transmitters, wherein each set includes all base station transmitters dominant to one of the plurality of portable transceivers having a message queued therefor. A base station transmitter is defined to be dominant when the base station transmitter can affect communications with the one of the plurality of portable transceivers even when different data transmissions are sent from all others of the plurality of base station transmitters. The method further comprises the steps of determining a group of the sets of base station transmitters, wherein no base station transmitter is included more than once in the group; and simultaneously transmitting from the sets of base station transmitters of the group. The base station transmitters included in each of the sets of the group transmit, in simulcast, the message queued for the one of the plurality of portable transceivers to which the base station transmitters of the set are dominant. Another aspect of the present invention is a controller in a radio communication system for forming and utilizing sets of base station transmitters selected from a plurality of base station transmitters to provide radio coverage in a plurality of dynamically assigned simulcast areas for communicating simultaneously with a plurality of portable transceivers. The controller comprises a network interface coupled to a communication network for accepting messages from message originators, and a processing system coupled to the network interface for processing and queuing the messages. The controller further comprises a transmitter interface coupled to the processing system for controlling the plurality of base station transmitters to transmit the messages, and a receiver interface coupled to the processing system for receiving acknowledgments from the plurality of portable transceivers. The processing system is programmed to form the sets of base station transmitters, wherein each set includes all base station transmitters dominant to one of the plurality of portable transceivers having a message queued therefor. A base station transmitter is defined to be dominant when the base station transmitter can affect communications with the one of the plurality of portable transceivers even when different data transmissions are sent from all others of the plurality of base station transmitters. The processing system is also programmed to determine a group of the sets of base station transmitters, wherein no base station transmitter is included more than once in the group; and to simultaneously transmit from the sets of base station transmitters of the group. The base station transmitters included in each of the sets of the group transmit, in simulcast, the message queued for the one of the plurality of portable transceivers to which the base station transmitters of the set are dominant.

BRIEF DESCRIPTION OF THE DRAWINGS

FIG. 7 is a flow chart depicting operation of the controller in accordance with the preferred embodiment of the present invention.

DESCRIPTION OF THE PREFERRED EMBODIMENT

Figure 1:
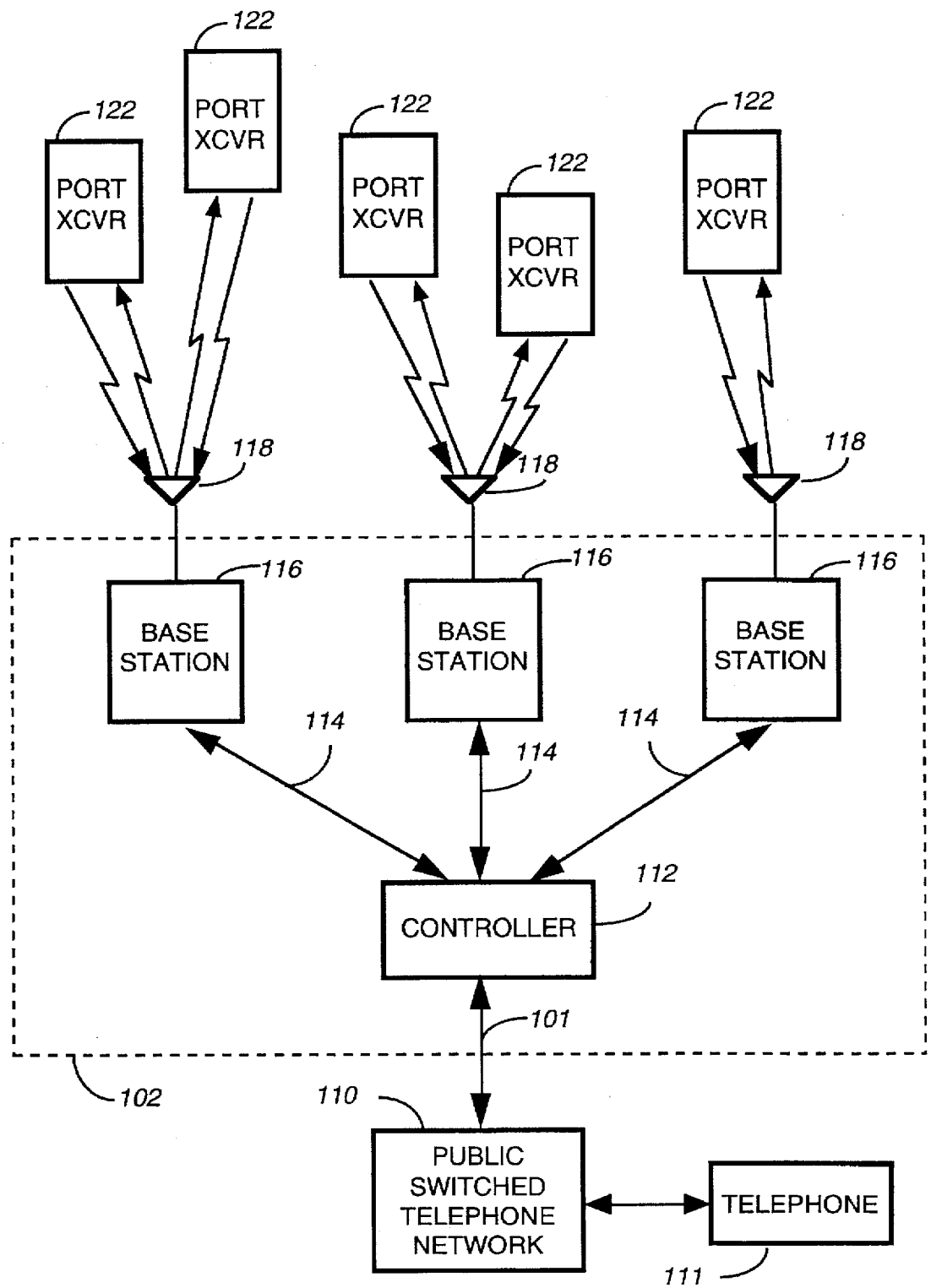
FIG. 1 is an electrical block diagram of a radio communication system in accordance with the preferred embodiment of the present invention.

Referring to FIG. 1, an electrical block diagram of a radio communication system in accordance with the preferred embodiment of the present invention comprises a fixed portion 102 including a controller 112 and a plurality of base stations 116, and a portable portion including a plurality of portable transceivers 122, preferably having acknowledge-back capability. The base stations 116 are used for communicating with the portable transceivers 122 utilizing conventional radio frequency (RF) techniques, and are coupled by communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receivers manufactured by Motorola, Inc. It will be appreciated that other similar hardware can be utilized as well for the controller 112 and the base stations 116.

Each of the base stations 116 transmits RF signals to the portable transceivers 122 via a transceiver antenna 118. The base stations 116 each receive RF signals from the plurality of portable transceivers 122 via the transceiver antenna 118. The RF signals transmitted by the base stations 116 to the portable transceivers 122 (outbound messages) comprise selective call addresses identifying the portable transceivers 122, and data or voice messages originated by a caller. The RF signals transmitted by the portable transceivers 122 to the base stations 116 (inbound messages) comprise responses that include positive acknowledgments (ACKs), negative acknowledgments (NAKs), and received transmitter color codes in accordance with the present invention, as will be described below. An embodiment of an acknowledge-back messaging system is described in U.S. Pat. No. 4,875,038 issued Oct. 17, 1989 to Siwiak et al., which is hereby incorporated herein by reference.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 coupled to the PSTN 110. It will be appreciated that, alternatively, other types of communication networks, e.g., packet switched networks and local area networks, can be utilized as well for transporting originated messages to the controller 112.

The protocol utilized for outbound and inbound messages is preferably similar to Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable two-way protocols can be used as well.

Figure 2:
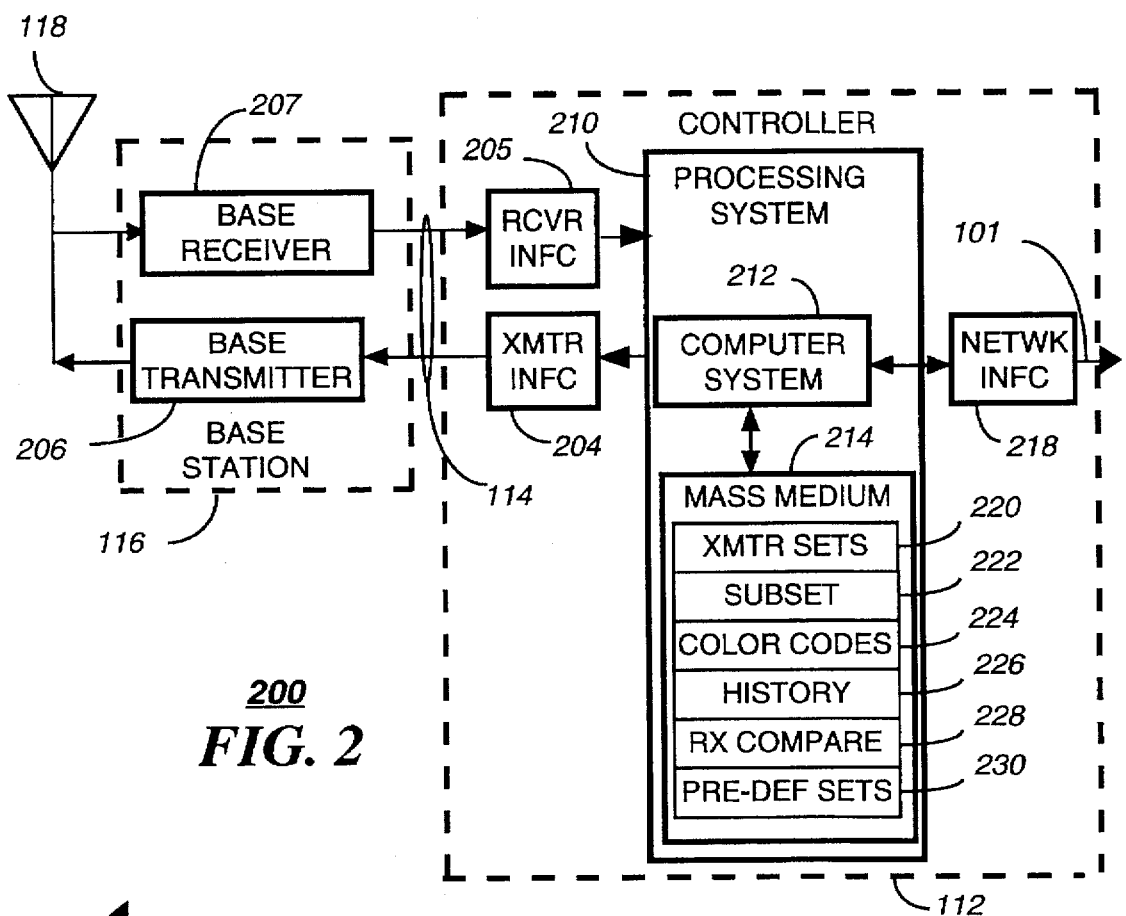
FIG. 2 is an electrical block diagram of portions of a controller and base station in accordance with the preferred embodiment of the present invention.

FIG. 2 is an electrical block diagram 200 of portions of the controller 112 and the base station 116 in accordance with the preferred embodiment of the present invention. The controller 112 includes a processing system 210, a transmitter interface 204, a receiver interface 205, and a network interface 218. The base station 116 includes a base transmitter 206 and at least one base receiver 207.

The processing system 210 is used for directing operations of the controller 112. The processing system 210 preferably is coupled through the transmitter interface 204 to the base transmitter 206 via the communication link 114. The processing system 210 preferably also is coupled through the receiver interface 205 to the base receiver 207 via the communication link 114. The communication link 114 utilizes, for example, conventional means such as a direct wire line (telephone) link, a data communication link, or any number of radio frequency links, such as a radio frequency (RF) transceiver link, a microwave transceiver link, or a satellite link, just to mention a few. The processing system 210 is also coupled to the network interface 218 for accepting outbound messages originated by callers communicating via the PSTN 110 through the telephone links 101.

In order to perform the functions necessary for controlling operations of the controller 112, as well as the base stations 116, the processing system 210 preferably includes a conventional computer system 212, and a conventional mass storage medium 214. The conventional mass storage medium 214 includes, for example, subscriber user information such as addressing and programming options of the portable transceiver 122.

The conventional computer system 212 is preferably programmed by way of software included in the conventional mass storage medium 214 for performing the operations and features required in accordance with the present invention. The conventional computer system 212 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the portable transceivers 122, and protocol processing of messages destined for the portable transceivers 122, just to mention a few. The conventional mass storage medium 214 is preferably a conventional hard disk mass storage device.

It will be appreciated that other types of conventional computer systems 212 can be utilized, and that additional computer systems 212 and mass storage media 214 of the same or alternative type can be added as required to handle the processing requirements of the processing system 210. It will be further appreciated that additional base receivers 207 either remote from or collocated with the base transmitter 206 can be utilized to achieve a desired inbound sensitivity, and that additional, separate antennas 118 can be utilized for the base transmitter 206 and the base receivers 207. It will be further appreciated that, alternatively, in some systems the transmitter 206 can be arranged such that it can transmit a plurality of independent messages on a plurality of communication channels at the same time. For such systems the term "transmitter" is hereby defined to mean "transmitter-channel combination." For example, a four-channel transmitter should be treated the same as four separate transmitters for the purposes of this document.

The mass medium 214 preferably includes software and various databases utilized in accordance with the present invention. A transmitter sets element 220 of the mass medium includes software and storage space for programming the processing system 210 to assign the transmitters 206 to sets, wherein each set is assigned all the transmitters 206 dominant to one or more portable transceivers 122 having a message queued therefor. A transmitter 206 is defined to be dominant when the transmitter 206 can affect communications with the one or more portable transceivers 122 while different data transmissions are being sent from all other transmitters 206. A subset element 222 includes software and storage space for programming the processing system 210 to determine a subset of the sets such that no transmitter 206 is assigned more than once to the subset. The subset element 222 also can program the processing system 210 to select the sets of the subset such that the number of the sets in the subset is maximized, consistent with latency and urgency requirements. This feature will be described in greater detail further below.

At an appropriate time, e.g., when a sufficient number of messages have been queued for transmission, the transmitters 206 of each set of the subset are directed by the controller 112 to simulcast the corresponding message intended for the one or more portable transceivers to which the transmitters of the set are dominant. Whenever one or more of the sets complete a transmission, the transmitter sets element 220 cooperates with the processing system 210 to add one or more new sets to the subset, thereby forming a new subset, wherein, as before, no transmitter 206 is assigned more than once in the new subset.

Also included in the mass medium 214 are a color codes element 224, a history element 226, a receiver compare element 228, and a pre-defined sets element 230. These elements cooperate with the transmitter sets element 220 to assist in the assignment of the transmitters 206 to the sets in accordance with the present invention. The color codes element 224 includes software and storage space for storing color codes recently received by ones of the portable transceivers 122. Preferably, the portable transceivers 122 report the received color codes to the controller 112 as a portion of a response to a "where are you" query from the fixed portion 102. As the color codes received by a portable transceiver 122 uniquely identify transmitters 206 that are near the portable transceiver 122, the transmitters 206 that are dominant to the portable transceiver 122 can be determined from the color codes. It is preferred that orthogonal color codes be utilized by the radio communication system. Orthogonal color codes allow the dominant transmitters 206 to be identified from interference patterns produced by the orthogonal color codes when the portable transceiver 122 receives simulcast signals from multiple transmitters 206 at once. Orthogonal color codes and their application to acknowledge-back messaging systems are described in U.S. Pat. No. 5,423,063 issued Jun. 6, 1995 to Goldberg, which is hereby incorporated herein by reference. It will be appreciated that, alternatively, other types of color codes, e.g., distance coded color codes, also can be used to identify the transmitters 206.

The history element 226 includes software and storage space for keeping records for each of the portable transceivers 122 concerning which of the transmitters 206 have communicated successfully with the portable transceiver 122 in the recent past, e.g., the last twenty-four hours. Such historical information is particularly useful for assigning the sets of transmitters dominant to the portable transceiver 122 when recent color code information does not exist, e.g., when selecting a set of transmitters for sending the "where are you" query (to confirm the expected location of the portable transceiver 122).

The receiver compare element 228 includes software and storage space for comparing and storing records for each portable transceiver 122 that indicate which base receivers 207 have received transmissions recently from the portable transceiver 122. Then from the geographic association of the receivers 207 and the transmitters 206, a set of transmitters dominant to the portable transceiver 122 can be assigned.

The pre-defined sets element 230 includes pre-programmed sets of transmitters defined, for example, by the operator of the system. Such pre-programmed sets can enable additional control by the service provider to select transmitter sets based upon an empirical analysis of the system.

It will be appreciated that the color codes, history, receiver compare, and pre-defined sets elements 224-230 can be utilized singly or in any combination in any particular system, depending upon the specific requirements of the system and the desires of the system operator.

Figure 3:
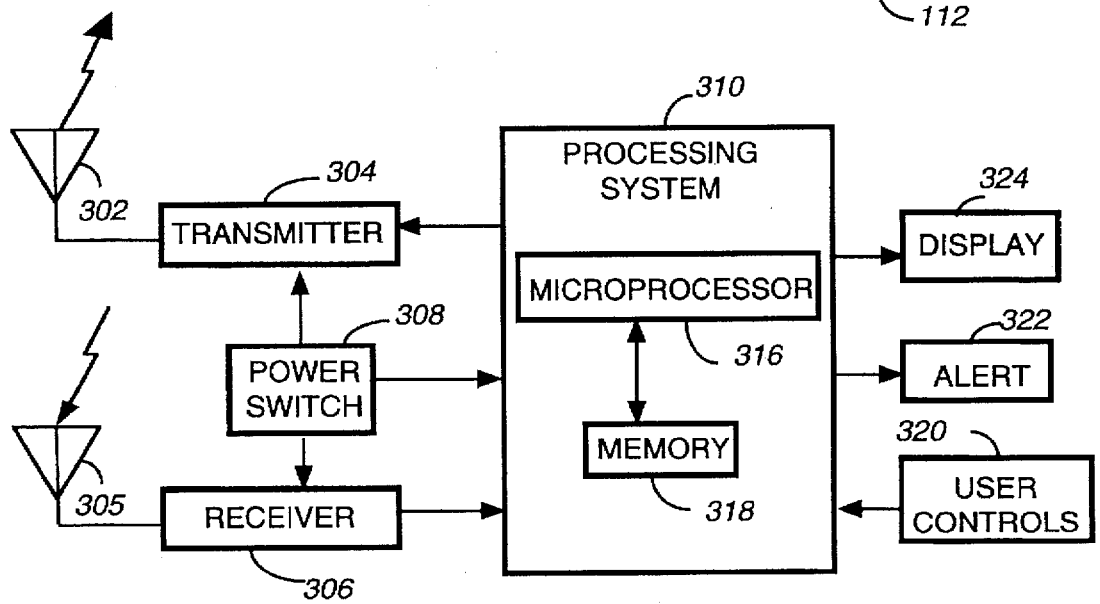
FIG. 3 is an electrical block diagram of a prior art portable transceiver utilized in practicing the present invention.

FIG. 3 is an electrical block diagram of the portable transceiver 122 utilized in practicing the present invention. The portable transceiver 122 comprises a transmitter antenna 302 for transmitting RF signals to the base stations 116, and a receiver antenna 305 for intercepting RF signals from the base stations 116. The transmitter antenna 302 is coupled to a conventional RF transmitter 304. Similarly, the receiver antenna 305 is coupled to a conventional RF receiver 306. It will be appreciated that, alternatively, the receiver 306 and transmitter 304 can be coupled to a single transceiver antenna, which transmits and intercepts RF signals to and from the base stations 116.

Radio signals received by the RF receiver 306 produce demodulated information at the output. The demodulated information is coupled to the input of a processing system 310 for directing operations of the portable transceiver 122, and for processing outbound messages. Similarly, inbound messages are processed by the processing system 310 and delivered to the RF transmitter 304 for transmission to the base stations 116. A conventional power switch 308, coupled to the processing system 310, controls the supply of power to the RF transmitter 304 and RF receiver 306, thereby providing a battery saving function.

To perform the necessary functions of the portable transceiver 122, the processing system 310 includes a microprocessor 316, and a memory 318. The microprocessor 316 is, for example, embodied by the M68HC08 micro-controller manufactured by Motorola, Inc. The memory 318 preferably includes a conventional read-only memory (ROM) and a conventional random-access memory (RAM).

The microprocessor 316 is programmed by way of the memory 318 to process received outbound messages, and in response thereto to create and format inbound messages. During outbound message processing, the microprocessor 316 samples the demodulated signal generated by the RF receiver 306. The microprocessor 316 then decodes an address in the demodulated data of the outbound message, compares the decoded address with one or more addresses stored in the memory 318, and when a match is detected, proceeds to read the transmitter color code received in the outbound message. The microprocessor 316 then preferably stores the transmitter color code in the memory 318 for maintaining a record of N most recently received transmitter color codes, N being a predetermined integer value.

Once the microprocessor 316 has processed the message, if the message was received without more errors than the microprocessor 316 can correct according to the protocol, then the microprocessor 316 transmits an acknowledgment (ACK) signal to the fixed portion 102. The microprocessor 310 then stores the message in the memory 318, and generates a call alerting signal to alert a user that a message has been received. The call alerting signal is directed to a conventional audible or tactile alerting device 322 for generating an audible or tactile call alerting signal. On the other hand, if the message was received with more errors than the microprocessor 316 can correct according to the protocol, then the microprocessor 316 transmits a negative acknowledgment (NAK) signal to the fixed portion 102, so that the fixed portion 102 can resend the message.

By the use of appropriate functions provided by the user controls 320, the outbound message is recovered from the memory 318, and displayed on a display 324, e.g., a conventional liquid crystal display (LCD). Alternatively, when the message is a voice message, the message is played out on a conventional audio circuit (not shown in FIG. 3) that is included in the portable transceiver 122. Preferably, the portable transceiver 122 utilizes components similar to those of the Tenor™ and Tango™ personal messaging units manufactured by Motorola, Inc. of Schaumburg, Ill. It will be appreciated that other similar components can be utilized as well for the portable transceiver 122.

Figure 4:
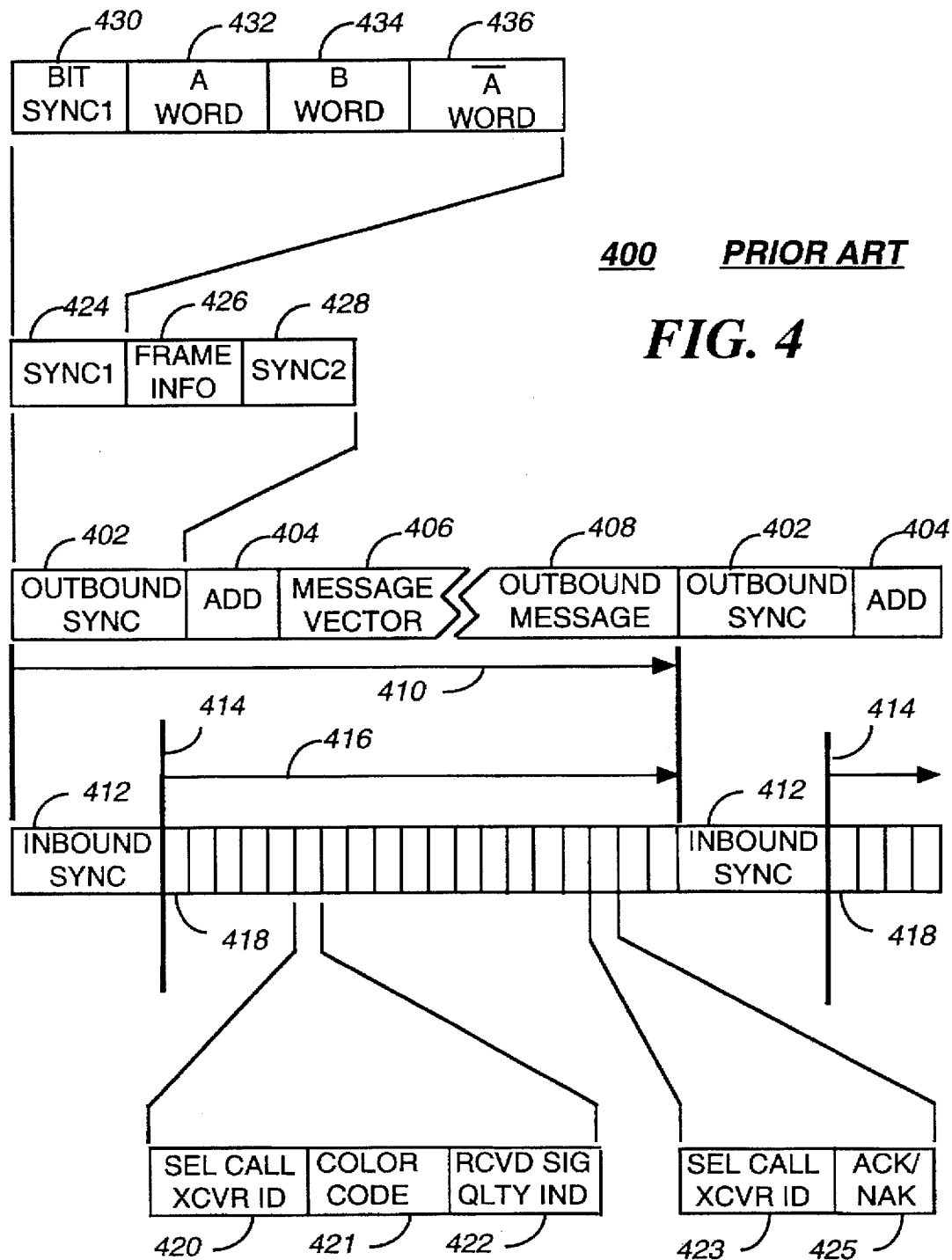
FIG. 4 is a timing diagram of a prior art communication protocol utilized in practicing the present invention.

FIG. 4 is a timing diagram 400 of a prior art communication protocol utilized, by way of example, by the two-way communication system in practicing the present invention. The signaling format operating on the outbound and inbound channels preferably operates on independent frequencies utilizing conventional frequency division multiplexing (FDM). Using FDM transmission, both outbound and inbound RF channel transmissions are depicted during a time interval 410.

The elements of one transmission frame of the outbound protocol comprise an outbound sync 402, a selective call address 404, a message vector 406, and an outbound message 408. The outbound sync 402 includes a sync1 field 424, a frame information field 426, and a sync2 field 428. The sync1 field 424 comprises a bit sync1 field 430, an A word 432, a B word 434, and an inverted A word 436. The bit sync1 field 430 provides the portable transceiver 122 a means for synchronization utilizing techniques well known in the art. The A word 432 identifies the FLEX™ family protocol version used, for example, FLEX™, InFLEXion™, or REFLEX™. The B word 434 preferably comprises one of one-hundred twenty-eight possible sixteen-bit color codes corresponding to a transmitter of the base stations 116. The consistency of transmitter color code reception preferably is utilized by the portable transceiver 122 to determine a received signal quality indication in accordance with the protocol standards utilizing techniques well-known in the art. The inverted A word 436 is used as redundant information for further verification of the integrity of the control channel information.

The selective call address 404 identifies the portable transceiver 122 for which the outbound message 408 is intended. The message vector 406 points in time within the signal format to the position of the outbound message 408 to be received by the portable transceiver 122, and specifies a radio frequency for receiving the message. The message vector 406 further provides information to the portable transceiver 122 identifying a scheduled time slot for acknowledging the message transaction. Preferably, the outbound protocol periodically transmits a plurality, e.g., 128, of the frames 402-408 to form a periodic synchronous transmission cycle.

The elements of the inbound protocol comprise an inbound sync 412, and scheduled time slots 418. The inbound sync 412 provides the base stations 116 a means for synchronization utilizing techniques well known in the art. Scheduled messages commence after the inbound sync 412 at a time boundary 414. A transmission time interval 416 depicts the time interval for scheduled transmissions on scheduled time slots 418 from the portable transceivers 122. One type of scheduled inbound message preferably comprises a selective call transceiver identification number 420, a color code 421, and a received signal quality indication 422. The selective call transceiver identification number 420 is preferably the address of the portable transceiver 122. The color code 421 is the color code (or color code interference pattern) received most reliably by the portable transceiver 122. The received signal quality indication 422 preferably is a value determined from the consistency of reception of the color code 421 by the portable transceiver 122. It will be appreciated that, alternatively, other methods, e.g., a received signal strength measurement, can be utilized to determine signal quality.

Another type of scheduled inbound message comprises a selective call transceiver identification number 423 and either an ACK or a NAK. This type of inbound message is used to inform the fixed portion 102 whether or not the portable transceiver 122 has received the outbound message 408 with a sufficiently low error rate to allow the processing system 310 to correct the received errors according to the error correction capabilities of the protocol.

Figure 5:
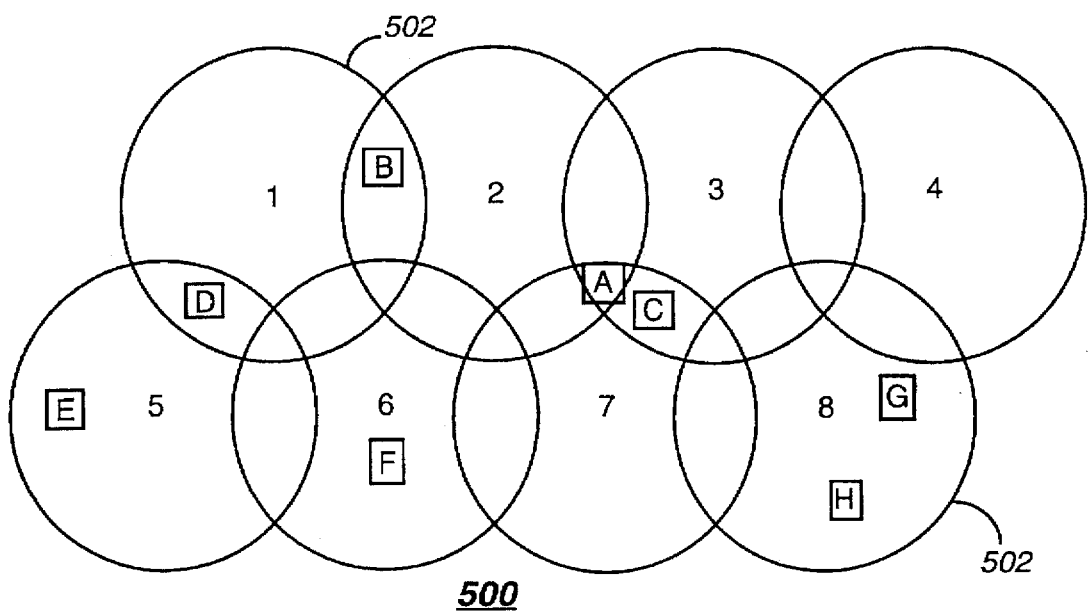
FIG. 5 is an example plan diagram of overlapping coverage cells of the radio communication system in accordance with the preferred embodiment of the present invention.

FIG. 5 is an example plan diagram 500 of overlapping coverage cells 502 of the radio communication system in accordance with the preferred embodiment of the present invention. Each of the cells 502 is centered on one of eight transmitters 1-8. Portable transceivers A-H are located at various positions throughout the cells 502. In this example, depending upon location a portable transceiver can have one, two, or three dominant transmitters. It will be appreciated that in a real system the number of dominant transmitters is not limited to three, but may be considerably larger than three, depending on system design, multipath environment, and other factors. TABLE 1 lists the sets of transmitters that are dominant to each of the portable transceivers.

TABLE 1

| TRANSMITTER SET FOR PORTABLE TRANSCEIVER | DOMINANT TRANSMITTERS IN THE SET |
|---|---|
| A | 2,3,7 |
| B | 1,2 |
| C | 3,7 |
| D | 1,5 |
| E | 5 |
| F | 6 |
| G | 8 |
| H | 8 |

In accordance with the present invention, a subset of the sets of transmitters is determined for simulcast transmission, wherein no transmitter is assigned more than once in the subset. For example, a subset consisting of sets B, C, E, F, and H satisfies the condition that no transmitter be assigned more than once in the subset. A subset consisting of sets A, D, and G also satisfies the condition.

Figure 6:
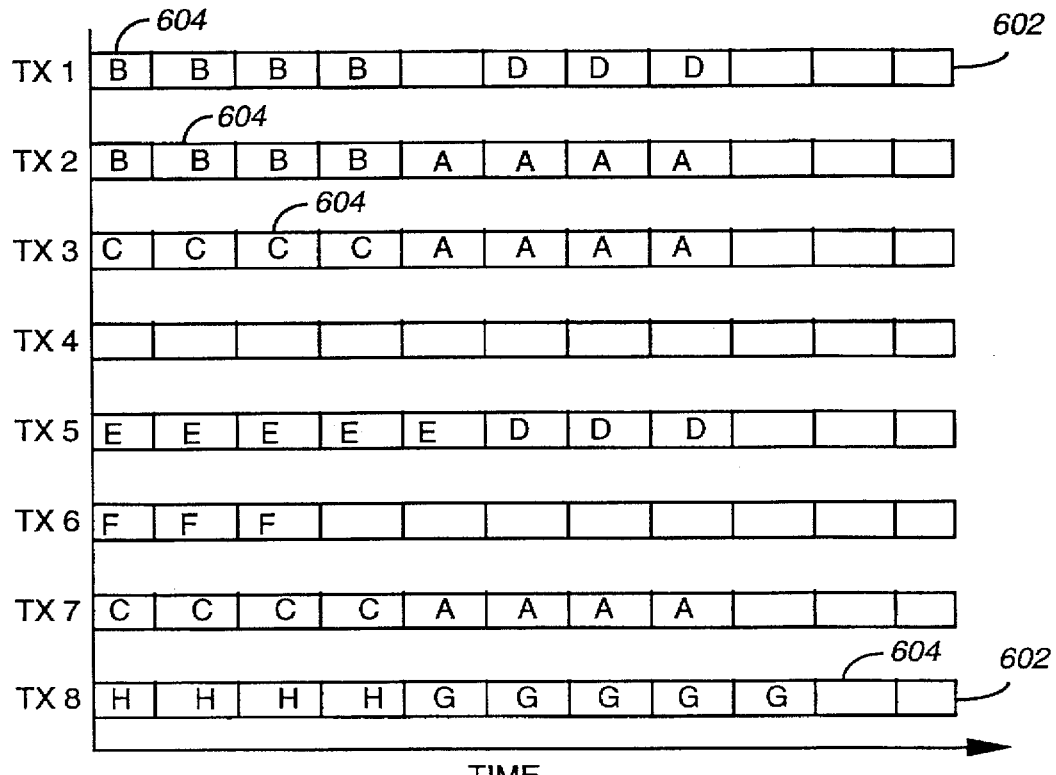
FIG. 6 is an example timing diagram of transmissions from subsets of transmitters in the radio communication system in accordance with the preferred embodiment of the present invention.

FIG. 6 is an example timing diagram 600 of transmissions from subsets of transmitters in the radio communication system in accordance with the preferred embodiment of the present invention. The timing diagram 600 continues the example of transmitters and portable transceivers arranged and positioned as in the plan diagram 500. The timing diagram 600 depicts a possible transmission sequence 602 for each of the transmitters 1-8 for sending messages to portable receivers A-H. Note that each set of transmitters is assigned to all the dominant transmitters of the corresponding portable transceiver. For example, set A is assigned transmitters 2, 3, and 7; set B is assigned transmitters 1 and 2; and so on. Because the subsets of transmitters are simulcast, the subsets can be identified as the sets of transmitters that are transmitting simultaneously during time slots 604 depicted in the diagram 600. For example sets B, C, E, F, and H form one of the subsets, and sets D, A, and G form another subset. Note also that the timing diagram 600 satisfies the requirement that a transmitter is assigned to any given subset no more than once. In addition, note that when any set or sets complete their transmissions, a new set or sets start transmissions so long as no transmitter is assigned more than once to the new subset formed by the new transmissions. For example, when set B completes its transmission on transmitter 1, set D cannot begin immediately in the next time slot, because set D also requires transmitter 5, which is stir in use by set E. However, when set E also completes, then set D can begin, as all transmitters required for set D are then available for simulcast.

As mentioned herein above, the subset element 222 also can program the processing system 210 to select the sets of the subset such that the number of the sets in the subset is maximized, consistent with latency and urgency requirements. Depending on the system conditions different strategies may be warranted. TABLE 2 depicts an example of a queue for a portable transceivers 122 assigned a specific channel. Each portable transceiver 122 has had a message in the queue for the specified time, and has a maximum time in queue goal. The set of transmitters 206 to be simulcast for transmitting each message is shown. For simplicity of the example each page is assumed to require the same amount of transmission time, equal to one time slot of the transmission protocol.

TABLE 2

| TIME IN QUEUE (MEASURED IN TIME SLOTS) | TRANSMITTER SET FOR PORTABLE TRANSCEIVER | DOMINANT TRANSMITTERS IN THE SET |
| --- | --- | --- |
| 20 | A | 2,3,7 |
| 15 | B | 1,2 |
| 18 | C | 3,7 |
| 5 | D | 1,5 |
| 15 | E | 5 |
| 10 | F | 6 |
| 3 | G | 8 |
| 7 | H | 8 |

During periods of low channel utilization, concerns about throughput and channel use efficiency are of little importance. The primary goal of the system therefore is to deliver messages with the shortest possible delay, in order to provide the most timely service to the portable transceivers 122. It is thus prudent to select the sets of the subsets based on oldest messages in the queue. The transmission order shown in TABLE 3 is preferred during low traffic periods. In TABLE 3 the selection strategy is to select the oldest messages that utilize transmitter sets compatible with the time slot and then add in the next oldest messages that also are compatible with the time slot, until as many sets as possible are included in the subset.

TABLE 3

| TIME SLOT (= SUBSET) | TIME IN QUEUE | TRANSMITTER SET | TRANSMITTERS |
| --- | --- | --- | --- |
| 1 | 20 | A | 2,3,7 |
| 1 | 15 | E | 5 |
| 1 | 10 | F | 6 |
| 1 | 7 | H | 8 |
| 2 | 18 + 1 | C | 3,7 |
| 2 | 15 + 1 | B | 1,2 |
| 2 | 3 + 1 | G | 8 |
| 3 | 5 + 2 | D | 1,5 |

During periods of high system utilization, however, the input traffic can often exceed the system's output capacity. In a messaging system this will mean building larger queues, which can at worst case exceed the buffer capability of the system and therefore cause lost of data. At a minimum, the queues will not be depleted until after the peak input times have passed. If the TABLE 3 strategy were to be followed, large queues would occur earlier, and be aggravated. It would be better to choose transmissions based on packing efficiency, and accept further aging of some messages, as depicted in TABLE 4.

TABLE 4

| TIME SLOT (SUBSET) | TIME IN QUEUE | TRANSMITTER SET | TRANSMITTERS |
| --- | --- | --- | --- |
| 1 | 20 | A | 2,3,7 |
| 1 | 10 | F | 6 |
| 1 | 7 | H | 8 |
| 1 | 5 | D | 1,5 |
| 2 | 18 + 1 | C | 3,7 |
| 2 | 15 + 1 | B | 1,2 |
| 2 | 15 + 1 | E | 5 |
| 2 | 3 + 1 | G | 8 |

In the above example, all of the pending messages would be sent in the first two time slots, thereby increasing throughput compared to the example depicted in TABLE 3, in which the messages require three time slots.

In actual practice, throughput and latency are not the only factors which can affect the selection and timing of sets of transmitters. Battery saving in the portable transceiver, whether the subscriber has opted for a specific guaranteed maximum delivery delay, emergency messages, likelihood of delivery success, et cetera, all can play a mitigating role. The selection criteria would thus likely be modified somewhat by these additional factors. In the example cases, the situations are mutually exclusive and the system can choose one methodology over the other by simply examining a threshold such as system utilization. Other goals, however, can exist and can sometimes generate mutually exclusive selection rules. In such cases it will be appreciated that one of ordinary skill in the art can apply techniques such as Linear Programming, Contiguous Logic, and Genetic Algorithms, as deemed appropriate to select the compatible sets of transmitters based on a compromise decision process which satisfies each of the selection goals to some degree.

FIG. 7 is a flow chart 700 depicting operation of the controller in accordance with the preferred embodiment of the present invention. The flow begins with the controller 112 receiving and queuing 702 messages for the portable transceivers 122. In response, the processing system 210 forms 704 sets of transmitters consisting of all transmitters that are dominant to each of the portable transceivers. The processing system then checks 706 whether conditions are ready for output. This could be determined, for example, by timing a periodic output cycle, or by having queued a predetermined number of messages. If conditions are not ready for output, the flow returns to step 702 to continue receiving and queuing more messages.

If, on the other hand, conditions are ready for output, then the processing system 210 determines 708 a subset of the sets of transmitters such that no transmitter is assigned more than once in the subset, and such that the number of sets in the subset is maximized, consistent with latency and urgency requirements, as explained in detail herein above. The processing system 210 then cooperates with the transmitter interface 204 to control the transmitters 206 to simulcast 710 each of the sets of the subset for transmitting the messages to the portable transceivers 122. The processing system 210 then checks whether any of the sets have completed their transmissions. If not, the flow returns to step 710 to continue the simulcast. If so, the flow moves to step 714, where the processing system 210 forms a new subset by adding at least one new set such that no transmitter 206 is assigned more than once in the new subset, and then returns to step 710 to simulcast the new subset. (Of course, step 714 is necessarily skipped if all existing sets have been placed in subsets.) The processing system 210 also then waits 716 a predetermined time, e.g., two minutes, for acknowledgments to be received, so that the processing system 210 can determine the reception status of the messages. The processing system 210 then dequeues 718 messages which have been received successfully, and leaves in queue messages that have not been received successfully. Next, the flow returns to step 702 to receive and queue more messages.

Thus it should be apparent by now that the present invention advantageously provides a transmission technique that offers both a high transmission quality and a high airtime efficiency. The present invention provides a method and apparatus that produces an airtime efficiency approaching that of the single cell transmission technique while retaining most of the transmission quality of the simulcast technique. This result is achieved by simulcasting each message on the minimum number of transmitters, i.e., the dominant transmitters, required to ensure high transmission quality, and by transmitting multiple messages simultaneously on non-conflicting co-channel transmitters to obtain maximum throughput.

What is claimed is:

1. A method in a radio communication system for forming and utilizing sets of base station transmitters selected from a plurality of base station transmitters to provide radio coverage in a plurality of dynamically assigned simulcast areas for communicating simultaneously with a plurality of portable transceivers, the method comprising the steps of:

forming the sets of base station transmitters, wherein each set includes all base station transmitters dominant to one of the plurality of portable transceivers having a message queued therefor, a base station transmitter being defined to be dominant when the base station transmitter can affect communications with the one of the plurality of portable transceivers even when different data transmissions are sent from all others of the plurality of base station transmitters;

determining a group of the sets of base station transmitters, wherein no base station transmitter is included more than once in group; and simultaneously transmitting from the sets of base station transmitters of the group, wherein the base station transmitters included in each of the sets of the group transmit, in simulcast, the message queued for the one of the plurality of portable transceivers to which the base station transmitters of the set are dominant.

2. The method of claim 1, wherein the forming step is based at least partly upon at least one transmitter color code received by the one of the plurality of portable transceivers.

3. The method of claim 1, wherein the radio communication system utilizes orthogonal color codes to identify the plurality of base station transmitters, and wherein the forming step is based at least partly upon a transmitter set identified by an interference pattern produced by the orthogonal color codes when received by the one of the plurality of portable transceivers.

4. The method of claim 1, wherein the forming step is based at least partly upon a record of at least one set of base station transmitters that has communicated successfully with the one of the plurality of portable transceivers.

5. The method of claim 1, wherein the forming step is based at least partly upon a reception of transmissions from the one of the plurality of portable transceivers by at least one base receiver associated with at least one base station transmitter dominant to the one of the plurality of portable transceivers.

6. The method of claim 1, wherein the forming step is based at least partly upon at least one pre-defined transmitter set.

7. The method of claim 1, further comprising the steps of:

determining a reception status of the message transmitted by each of the sets of the group after the simulcasting step; and dequeuing the message in response to the reception status indicating that the message has been received successfully.

8. The method of claim 1, further comprising the steps of:

determining a reception status of the message transmitted by each of the sets of the group after the transmitting step; and leaving the message in queue in response to the reception status indicating that the message has not been received successfully.

9. The method of claim 1, wherein the determining step comprises the step of selecting the sets of the group such that a count of the sets in the group is maximized, consistent with latency and urgency requirements, thereby maximizing system throughput.

10. The method of claim 1, further comprising the step of beginning a transmission by at least one new set selected from the sets of base station transmitters, in response to a completion of a transmission by at least one of the sets of the group, thereby forming a new group, wherein no base station transmitter is included more than once in the new group.

11. A controller in a radio communication system for forming and utilizing sets of base station transmitters selected from a plurality of base station transmitters to provide radio coverage in a plurality of dynamically assigned simulcast areas for communicating simultaneously with a plurality of portable transceivers, the controller comprising:

a network interface coupled to a communication network for accepting messages from message originators;

a processing system coupled to the network interface for processing and queuing the messages;

a transmitter interface coupled to the processing system for controlling the plurality of base station transmitters to transmit the messages; and a receiver interface coupled to the processing system for receiving acknowledgments from the plurality of portable transceivers, wherein the processing system is programmed to:

form the sets of base station transmitters, wherein each set includes all base station transmitters dominant to one of the plurality of portable transceivers having a message queued therefor, a base station transmitter being defined to be dominant when the base station transmitter can affect communications with the one of the plurality of portable transceivers even when different data transmissions are sent from all others of the plurality of base station transmitters;

determine a group of sets of base station transmitters, wherein no base station transmitter is included more than once in the group; and simultaneously transmit from the sets of base station transmitters of the group, wherein the base station transmitters included in each of the sets of the group transmit, in simulcast, the message queued for the one of the plurality of portable transceivers to which the base station transmitters of the set are dominant.

12. The controller of claim 11, wherein the processing system is further programmed to form the sets of base station transmitters based at least partly upon at least one transmitter color code received by the one of the plurality of portable transceivers.

13. The controller of claim 11, wherein the radio communication system utilizes orthogonal color codes to identify the plurality of base station transmitters, and wherein the processing system is further programmed to form the sets of base station transmitters based at least partly upon a transmitter set identified by an interference pattern produced by the orthogonal color codes when received by the one of the plurality of portable transceivers.

14. The controller of claim 11, wherein the processing system is further programmed to form the sets of base station transmitters based at least partly upon a record of at least one set of base station transmitters that has communicated successfully with the one of the plurality of portable transceivers.

15. The controller of claim 11, wherein the processing system is further programmed to form the sets of base station transmitters based at least partly upon a reception of transmissions from the one of the plurality of portable transceivers by at least one base receiver associated with at least one base station transmitter dominant to the one of the plurality of portable transceivers.

16. The controller of claim 11, wherein the processing system is further programmed to form the sets of base station transmitters based at least partly upon at least one predefined transmitter set.

17. The controller of claim 11, wherein the processing system is further programmed to:

determine a reception status of the message transmitted by each of the sets of the group after simulcasting the sets of the group; and dequeue the message in response to the reception status indicating that the message has been received successfully.

18. The controller of claim 11, wherein the processing system is further programmed to:

determine a reception status of the message transmitted by each of the sets of the group after simulcasting the sets of the group; and leave the message in queue in response to the reception status indicating that the message has not been received successfully.

19. The controller of claim 11, wherein to determine the group of the sets, the processing system is further programmed to select the sets of the group such that a count of the sets in the group is maximized, consistent with latency and urgency requirements, thereby maximizing system throughput.

20. The controller of claim 11, wherein the processing system is further programmed to begin a transmission by at least one new set selected from the sets of base station transmitters, in response to a completion of a transmission by at least one of the sets of the group, thereby forming a new group, wherein no base station transmitter is included more than once in the new group.

* * * * *